United States Patent [11] 3,602,869

[72] Inventors Francis L. Metz
 Somerset Center;
 Bryce B. Evans, Jackson, both of, Mich.
[21] Appl. No. 800,676
[22] Filed Feb. 19, 1969
[45] Patented Aug. 31, 1971
[73] Assignee Aeroquip Corporation
 Jackson, Mich.

[54] MULTIPLE COUPLING PANEL
 3 Claims, 3 Drawing Figs.
[52] U.S. Cl. .................................................... 339/15,
 339/91
[51] Int. Cl. ............................................... H01r 13/54
[50] Field of Search .......................................... 339/15, 16,
 75, 91, 10; 285/311

[56] References Cited
 UNITED STATES PATENTS
2,379,226 6/1945 Frey ............................... 339/15

| 2,432,120 | 12/1947 | Neill | 339/10 |
| 2,857,576 | 10/1958 | Ueckert | 339/16 |
| 3,311,863 | 3/1967 | Beale | 339/45 (M) |
| 3,488,622 | 1/1970 | Gley | 339/45 (M) |

FOREIGN PATENTS

| 650,218 | 2/1951 | Great Britain | 285/311 |

Primary Examiner—Marvin A. Champion
Assistant Examiner—Robert A. Hafer
Attorney—Jerry K. Harness ABSTRACT: A pair of plate members have aligned apertures in which are mounted interfitting coupling elements. Pilot pins mounted on one of the members guide them into facing relation so that the coupling elements are connected. The members are held in coupled relation by toggle links at opposite ends of the members. Thus, one of the members may be stationarily secured, and a plurality of hydraulic and/or electrical couplings connected or disconnected by joining or separating the panel members.

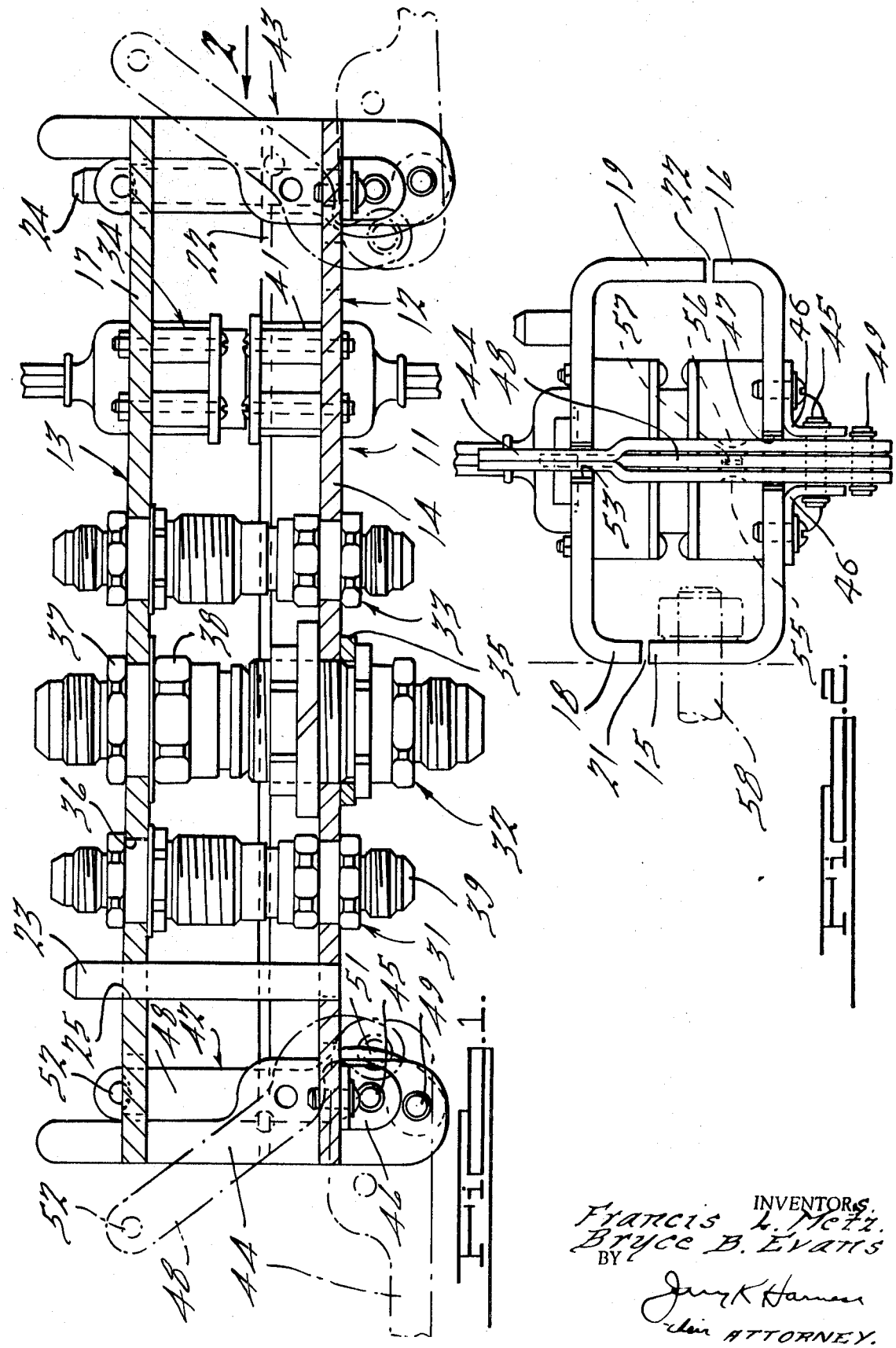

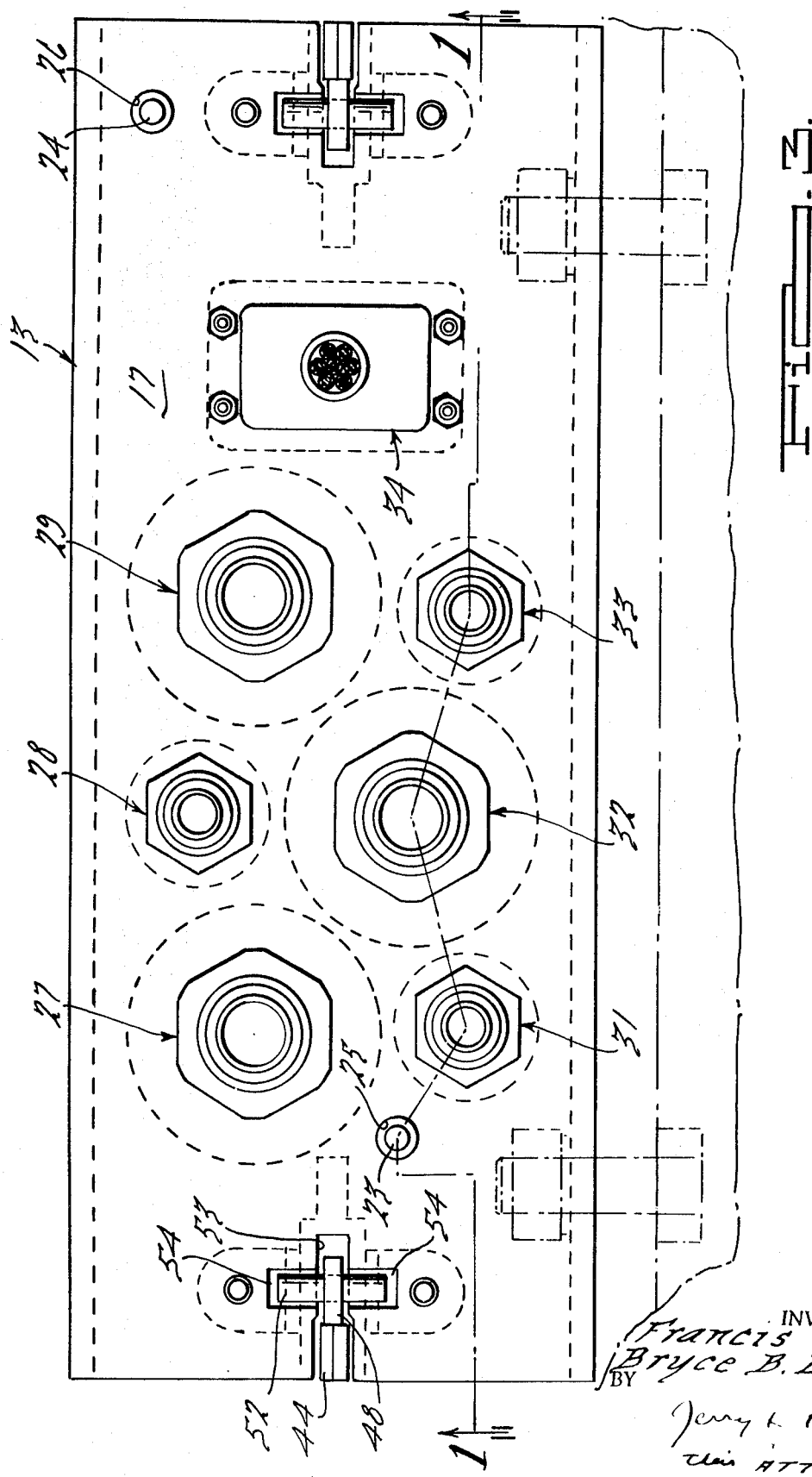

MULTIPLE COUPLING PANEL

BACKGROUND OF THE INVENTION

1. Field of the Invention

The invention relates to means for simultaneously connecting and disconnecting a plurality of fluid and/or electrical conduits, for example, between the engine and cab of a truck.

2. Description of the Prior Art

Conventionally, the various fluid and/or electrical conduits between a truck power plant and cab have been individually connected and disconnected, and no convenient and secure means has been provided which will simultaneously connect or disconnect such lines with a minimum of effort.

SUMMARY OF THE INVENTION

According to the invention, a multiple coupling panel is provided having two channel-shaped members, with the web of one member carrying halves of various couplings and the web of the other member the complementary coupling halves. The coupling panels are formed of channel-shape primarily for stiffening purposes but could be merely flat plates if desired. Other means of stiffening could be used without departing from the scope of the invention. Pilot pins are mounted on one or both members so that they may be brought together in facing relation. A pair of toggle clamps are mounted at opposite ends of one of the members and engage the ends of the other member so that after the connections of the coupling elements have been effected, the panel members may be firmly secured together by swinging the clamp handles into locking position. The fluid and/or electrical couplings are of the type which may be connected to or disconnected by forcing the coupling halves together or pulling them apart. Thus, the couplings may all be simultaneously connected or disconnected by drawing together or separating the panel members. BRIEF DESCRIPTION OF THE DRAWINGS FIG. 1 is a side elevational view in cross section of a typical panel showing the members in joined position and having both fluid and electrical couplings, the view being taken along the line 1—1 of FIG. 3;

FIG. 2 is an end view of the panel taken in the direction of the arrow 2 of FIG. 1, and FIG. 3 is a top plan view of the panel showing the manner in which one panel member is stationarily secured and also illustrating the engagement of the toggle clamps. DESCRIPTION OF THE PREFERRED EMBODIMENT The panel is generally indicated at 11 and comprises a first panel member generally indicated at 12 and a second panel member generally indicated at 13. Each member is of channel-shaped construction, member 12 having a web 14 and flanges 15 and 16 while member 13 has a web 17 and flanges 18 and 19. The lengths and widths of the members are equal and the relative widths of the flanges are such that when the members are joined they will be in facing relation as shown in FIG. 2, and will form an elongated boxlike enclosure of rectangular cross-sectional shape. It should be understood that although the two flanges of each member 12 and 13 are of unequal width, they could be of equal width within the principles of the invention. When in their joined position, small gaps 21 and 22 will exist between flanges 15 and 18 on the one hand and flanges 16 and 19 on the other.

A pair of pilot pins 23 and 24 are mounted on the web 14 of member 12 and extend through apertures 25 and 26 respectively in web 17 of member 13 when the panel members are joined. The pilot pins will insure proper alignment of the coupling elements, as will be later seen. It is within the scope of the invention to have the pilot pins mounted on either member, or to have one mounted on each member.

A plurality of fluid couplings and an electrical coupling are carried by webs 14 and 17 of members 12 and 13 respectively. Seven couplings are shown in the figures and are generally indicated at 27, 28, 29, 31, 32, 33 and 34. Of these, all except coupling 34 are fluid couplings. They are preferably of the type which may be connected or disconnected merely by pushing together or pulling apart the coupling halves or elements. For example, couplings 27, 28, 29, 31, 32 and 33 shown in FIG. 1, may be of the type shown in U.S. Pat. No. 3,117,592 issued Jan. 14, 1964, to John C. Abbey and Maynard G. Charles. The couplings may be for different purposes, such as fuel, refrigerant and compressed air lines. In order to insure proper connection and disconnection of all the couplings, which may be of different sizes, spacers such as that indicated at 35 in FIG. 1 for coupling 32 may be provided. The coupling elements are mounted in apertures 36 in the webs of members 12 and 13 and are secured on opposite sides of these webs by nuts 37 and 38. The outwardly extending portions 39 of the coupling elements are provided with means for connections to flexible fluid lines (not shown).

Electrical coupling 34 likewise comprises male and female elements mounted on the two members with spacers 41 being utilized to locate the terminals properly with respect to the other couplings.

A pair of clamping assemblies generally indicated at 42 and 43 are provided at opposite ends of the panel. These clamping assemblies are carried by member 12 and each comprises a lever 44 pivoted at 45 between a pair of brackets 46 secured to the outside of web 14 on either side of an open-ended slot 47 therein. Lever 44 is made up of two pieces, as seen in FIG. 2, between which is disposed a clamping link 48. This link is pivoted at 49 to lever 44 and has an offset portion 51 (FIG. 1) to provide clearance for pivot 45. The outer end of clamping link 48 carries a cross pin 52, and the lever is receivable by an open-ended slot 53 in web 17 of member 13. Once so received, pin 52 may be drawn against a pair of concave surfaces 54 adjacent slot 53 (FIG. 3) by swinging lever 44 from an unclamping position shown in dot-dash lines in FIG. 1 to a clamping position shown in solid lines. When so rotated, pivot 49 will pass overcenter with respect to a line connecting the axes of pin 52 and pivot 45, thus drawing the couplings tightly together and creating a toggle action which will maintain the panel members in securely locked position. A pair of depressed portions 55 and 56 on the parts which comprise lever 44 (FIG. 2) will snap into position in an aperture 57 in link 48 when lever 44 is swung to its clamping position. This coaction of the depressed portions and aperture will serve as a detent for lever 44 so that the clamp will not be inadvertently opened. When levers 44 are in their clamping positions they will be within the lateral confines of panel 11, thus contributing to the compactness of the unit.

In operation, assuming an initial condition in which the panel members are separated and clamps 42 and 43 are in their unclamping positions, links 48 will be swung outwardly, thus permitting the panel members to be brought together. In a typical installation, panel member 12 may be stationarily secured to a truck cab, for example, by bolts shown in dot-dash lines at 58 in FIG. 2 which pass through flange 15. Panel 13 on the other hand may be connected by flexible conduits to the truck engine or power plant. When bringing together members 12 and 13, they will be guided into proper position by pilot pins 23 and 24, which are of sufficient length to align the panel members before the coupling halves are brought together. The force required to connect the couplings will be furnished by swinging links 48 into slots 53 and then rocking levers 44 to their solid line positions in FIG. 1, thus drawing the panel members together. To disconnect the couplings, levers 44 will be swung in the opposite direction, links 48 withdrawn from slots 53 and panel member 13 withdrawn from member 12. In both the joining and separating movements, all the couplings will be simultaneously connected and disconnected in a quick and efficient manner, and will be securely held in connected relation when the panel members are joined.

What is claimed is:

1. In a multiple coupling panel construction, a pair of flat panel members being movable between a separated position and a joined position in which they face each other, spaced pilot pins carried by at least one of said members and coacting with apertures in the other member to properly align the members when joined, at least two pairs of aligned apertures in said members, complementary coupling elements disposed within said aligned apertures, means securing said coupling elements to said panel members and overcenter clamping means mounted at opposite ends of one of said members and engageable with the outside of the other member to draw the members together with an overcenter action, said clamping means comprising two clamping assemblies, each assembly having a lever pivoted on said member and a clamping link pivoted to said lever, open-ended slots on the other member for receiving said links, the links having cross pins engageable with the outside of said other member, said levers being swingable between unclamping positions in which said links are lifted from said other member and free to be separated therefrom, and clamping positions in which the cross pins of said links are drawn against said other member.

2. The combination according to claim 1, further provided with a pair of open-ended slots on said first member, said lever being pivotally mounted on brackets mounted alongside said last-mentioned slots and being within the lateral confines of the panel when in their clamping positions.

3. The combination according to claim 2, said lever being fabricated of two parts, said link being disposed between said two parts, and coacting detent means on the overlapping portions of said lever and link to retain the lever in its clamping position.